March 18, 1958  G. L. HODDY  2,827,583
SHADED POLE MOTOR
Filed Oct. 26, 1954  3 Sheets-Sheet 1
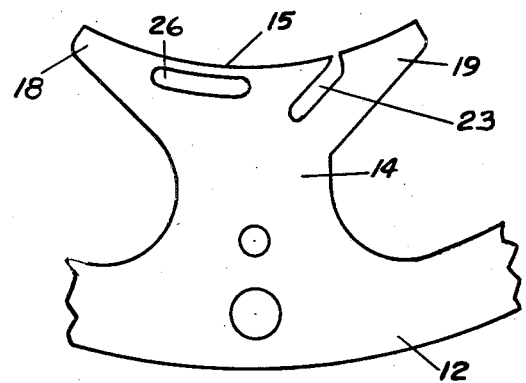
Fig. 4
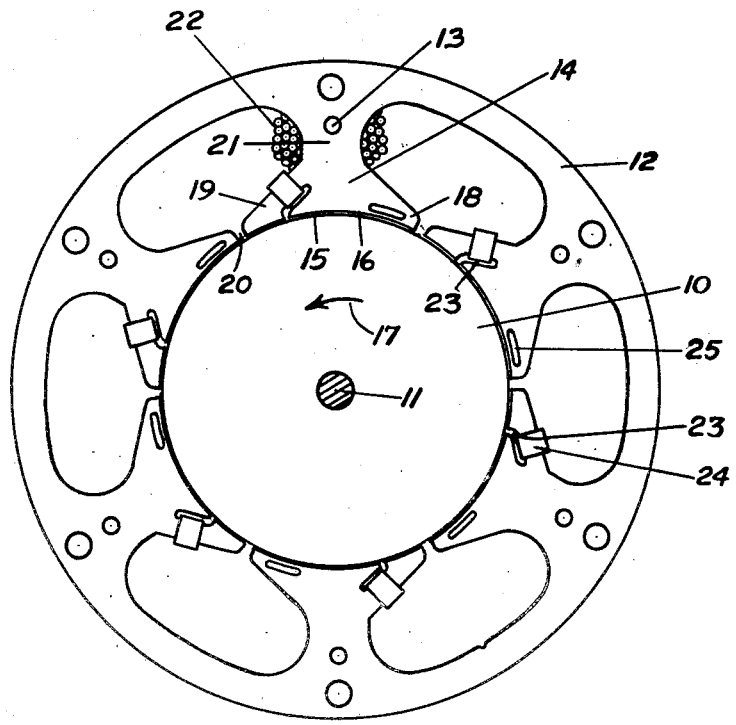
Fig. 1
INVENTOR.
GERALD L. HODDY
BY
ATTORNEY March 18, 1958  G. L. HODDY  2,827,583
SHADED POLE MOTOR Filed Oct. 26, 1954  3 Sheets-Sheet 2

INVENTOR.
GERALD L. HODDY
BY
ATTORNEY

March 18, 1958 G. L. HODDY 2,827,583
SHADED POLE MOTOR

Filed Oct. 26, 1954 3 Sheets-Sheet 3

INVENTOR.
GERALD L. HODDY
BY
ATTORNEY

United States Patent Office 2,827,583
Patented Mar. 18, 1958

2,827,583

SHADED POLE MOTOR

Gerald L. Hoddy, Owosso, Mich., assignor to Universal Electric Corporation, Owosso, Mich., a corporation of Michigan Application October 26, 1954, Serial No. 464,703

2 Claims. (Cl. 310—172)

The present invention relates generally to electric motors and more particularly and specifically to improvements in electric motors of the shaded pole type.

Shaded pole motors are now widely used in a diversity of applications where relatively small power outputs are required. While the general characteristics of shaded pole motor operation are generally recognized, the basic theories underlying their operation is not well understood.

For example, it is known and generally accepted that the shading coils used in the pole structure of these motors provide an ancillary flux which lags the main or primary motor flux and results in a tendency toward a rotating field which in turn creates starting torque. On the other hand, there has been insufficient knowledge of the operational theories of shaded pole motors to enable the production of such a motor having both increased efficiency and starting torque, one or both of which characteristics have been insufficient in prior constructions.

Some attempts have been made heretofore to improve shaded pole motor constructions in an effort to improve the efficiency and starting torque characteristics of these motors. Most of these prior attempts have resulted in increasing the air gap between the rotor and the pole face over a portion of the length of the pole face. One such construction embodying a partially recessed pole face is shown and described in United States Letters Patent No. 2,591,117, issued to Earle W. Ballentine.

While motors of the Ballentine type, which utilize an increased air gap section between the pole face and the rotor, produce an increase in motor efficiency over prior constructions, these motors are inherently limited in the amount of increase obtainable in these operating factors, and the relative variations in effect obtainable between these factors is negligible.

Still other attempts have been made to improve the speed-torque curves of shaded pole motors by the use of costly and intricate magnetic wedges and with increased rotor skews. However, in each such instance the increase in starting torque has been obtained at the expense of efficiency which has been substantially decreased.

I have discovered, however, that it is possible to produce a shaded pole motor which is capable of obtaining a wide variety of relative effects between the operating characteristics of efficiency and starting torque and which is capable of operation at efficiencies and with starting torques far in excess of any prior shaded pole motors.

It is therefore a general object of the present invention to provide an electric motor of the shaded pole type which is capable of obtaining operating characteristics far superior to those attainable by prior motor constructions.

It is a primary object of the present invention to provide an electric motor of the shaded pole type which is so constructed as to provide effective control and distribution of pole flux resulting in greatly improved torque and efficiency characteristics of motor operation.

Another object of the present invention is the provision of a shaded pole motor of such a construction that the operating characteristics of efficiency and starting torque are greatly increased and improved over the same characteristics obtainable with prior motor constructions.

A further object of this invention is to provide a shaded pole motor construction which includes an improved pole structure which produces a re-routing of the heretofore normal flux path at the top of the A. C. sine wave to produce an increased punch in the shaded pole section.

An additional feature of the present invention is the provision of a shaded pole motor having an improved pole structure which, by producing an improved distribution of flux, creates a sweeping flux action which aids in maintenance of torque at slip frequencies of motor operation.

A still further object and advantage of the present invention rests in the provision of a pole structure for a shaded pole motor which permits the achievement of varying effects between the relative starting torque and efficiency characteristics of the motor to permit the motor to be most effectively adapted to its desired use.

Still another object of the present invention is the provision of a shaded pole motor having the operational advantages heretofore set forth which is of relatively simple and inexpensive design and manufacture.

Still further objects and advantages of the present invention will become readily evident to those skilled in the art when the following general statement and detailed description are read in the light of the accompanying drawings in which are illustrated preferred embodiments of the invention, illustrative of the best modes in which applicant has contemplated applying principles of the invention.

The nature of the present invention may be stated in general terms as including an electric motor of the shaded pole type comprising a rotor, a stator surrounding said rotor and being divided into a plurality of poles, said poles being provided with shaded sections on corresponding edges thereof about the stator, and cut-out portions forming flux shifting slots in said poles adjacent the edges thereof remote to the shaded section and spaced outwardly of the stators away from the pole faces.

Referring now to the accompanying drawings in which like numerals designate similar parts throughout the several views:

Fig. 1 is an elevational view of the rotor and stator constructions constituting the present invention.

Fig. 4 is a fragmentary illustration of a modified form of the improved pole construction.

Figure 3:
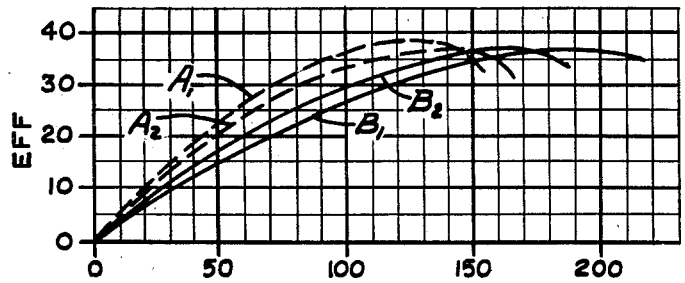
Fig. 3 is a graphic illustration for comparison purposes between the efficiency-torque curves of the best of prior constructions and the present invention.

Referring now to the drawings, and with particular reference to Fig. 1, there is illustrated a shaded pole motor which is disclosed for purposes of illustration only as a six pole construction. The motor construction includes generally a rotor 10 mounted for rotation on a shaft 11 and a circular stator 12 concentrically mounted around the rotor.

The stator 12 is made up conventionally of a plurality of laminations secured in face to face juxtaposition by rivets 13 or the like to form a unitary structure. The stator unit is cut or punched by well known manufacturing methods to provide a plurality of pole members 14 about the inner circumference of the stator. Each of the pole members constitutes substantially a T-shaped element with the head of the T disposed inwardly toward the rotor and being provided with an arcuate face 15 thereon concentrically spaced from the rotor circumference to provide a predetermined air gap 16 between the pole face and the rotor. The extended ends of the T-headed pole members form remote edges on the poles which, dependent upon the direction of rotation of the rotor, are designated as leading or trailing edges. For purposes of illustration of the present invention it will be assumed that the rotor 10 rotates in a counterclockwise direction, as indicated by arrow 17, so that the edges 18 of each pole disposed in a clockwise direction will be leading edges, and the pole edges 19 disposed in a counterclockwise direction will be trailing edges.

In the operation of forming the pole 14 in the stator unit, the stator is punched or cut to provide equal spacing between the adjacent edges of adjacent poles around the stator, and the openings 20 formed between the adjacent edges in the region of the pole faces extend outwardly of the stator where they are enlarged substantially and form radial air gaps 20 intermediate the leg or trunk sections 21 of the adjacent T-shaped poles. The conventional pole windings 22 are made around the trunk or leg sections 21 of the poles for the purpose of producing primary or main flux in the pole.

In conformity with the usual construction of shaded pole motors, each of the pole members 14 is provided adjacent the trailing edge thereof with an inclined, slotted opening 23 which opens outwardly of the stator through the pole face and is turned to extend upwardly and inwardly of the pole. These slotted openings 23 are adapted to receive a shading ring or winding 24 about the tip portion of the pole adjacent the trailing edge. The shading windings on the trailing section of the pole are for the well recognized purpose of producing an ancillary flux in the shaded section of the pole adjacent the trailing edge thereof which flux lags the main or primary flux of the pole created by the pole windings 22. The use and purpose of the shaded pole section is well known and recognized and will therefore not be described herein.

In the construction illustrated in Fig. 1 there is shown what I have chosen to designate as a flux shifting slot 25 which is located generally in the leading edge section of the pole. The flux shifting slot generally consists of an arcuate opening which is punched or cut out of the pole at a point closely adjacent the leading edge thereof and spaced outwardly of the stator from the pole face so as to be completely out of communication with the pole face.

I have discovered that by locating the flux shifting slot 25 as described to provide an isolated air gap in the body of the pole serves to produce a re-routing of the flux path at the top of the A. C. sine wave which greatly increases the punch in the shaded pole tip and serves to create a sweeping flux action which substantially assists in maintaining torque at slip frequencies in the motor operation.

Figure 2:
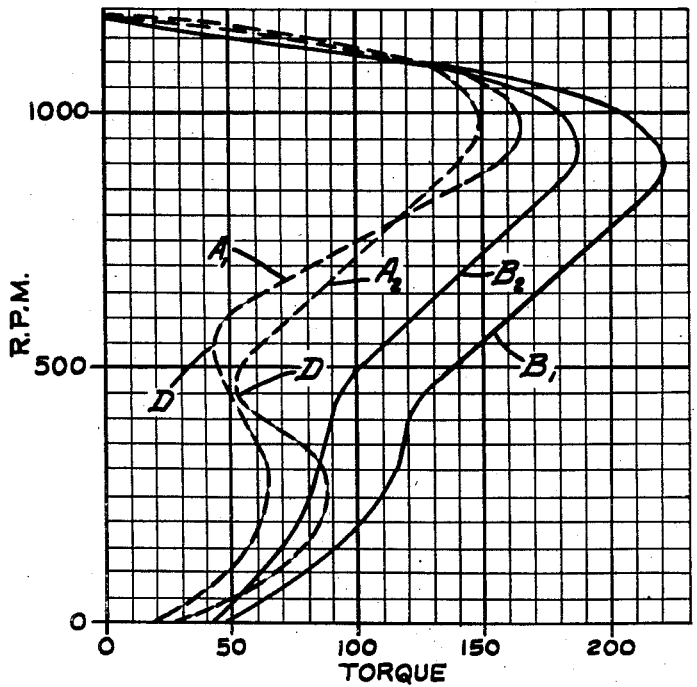
Fig. 2 is a graphic illustration for comparison purposes of speed-torque curves of the best of prior constructions and of the present invention.

With reference to Fig. 2 there is illustrated in graphic form comparative torque-speed curves obtained from operational readings taken from the best of the prior art shaded pole motor constructions and a motor constructed in accordance with the present invention. In the graphic illustration the dotted line curves $A_1$ and $A_2$ are those illustrating the torque-speed characteristics of the prior art construction while the solid line curves $B_1$ and $B_2$ are those obtained with operation of a motor constructed in accordance with the present invention. The graphic lines $A_1$ and $B_1$ were obtained from prior art and present invention motor constructions having 1⅝ rotor bar skew, while lines $A_2$ and $B_2$ represent motors of prior and present construction respectively having 2½ rotor bar skew.

The graphic designations of Fig. 2 not only indicate that the effective torque obtained with the present motor construction is consistently higher throughout the entire speed range of the motor, but it also illustrates that there is a substantial reduction in the characteristic torque dip, D, which is common at slip frequency speeds of operation of the prior motors.

Fig. 3 is a graphic illustration of the comparative torque-efficiency curves between the same motor constructions referred to with reference to Fig. 2 and showing the improved characteristics of the present motor.

In the modified form of the present invention shown in Fig. 4 there is illustrated a single pole portion 14 of the stator 12 of the type heretofore described having a shaded trailing edge 19. In this modified form an arcuately slotted flux shifting slot 26, similar to the gap 25 heretofore described, is punched or cut out of the pole at a location spaced outwardly of the stator from the pole face 15 with the arcuate lines defining the length of the slotted gap 26 being substantially concentric with arcuate face 15 of the pole and the rotor circumference.

The slotted flux shifting slot 26, unlike prior described gap 25, is located inwardly from the leading pole edge 18 toward the radial center of the pole 14. By varying the circumferential location of the flux shifting slot toward and away from the leading edge 18 of the pole it is possible to obtain a variety of relative effects between the motor efficiency and starting torque characteristics of the motor.

Figure 6:
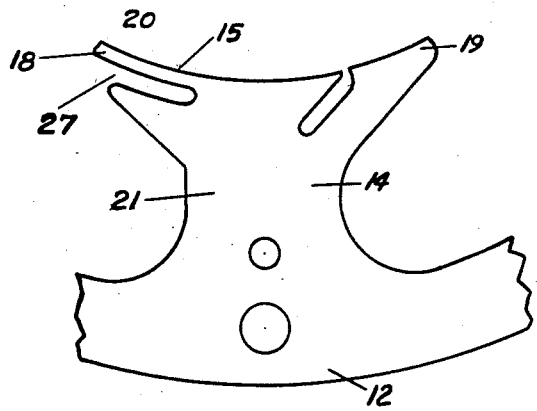
Fig. 6 is a fragmentary illustration of still a further form of pole construction.

By opening an arcuately slotted flux shifting slot 27 inwardly of the leading edge 18 of the pole 14 from a point along the length of the adjacent radial air gap 20, Fig. 6, still further variations in efficiency and torque effects can be attained. Variations in the length of the slotted gap inwardly from the leading edge will provide a variety of efficiency and torque effects.

Figure 5:
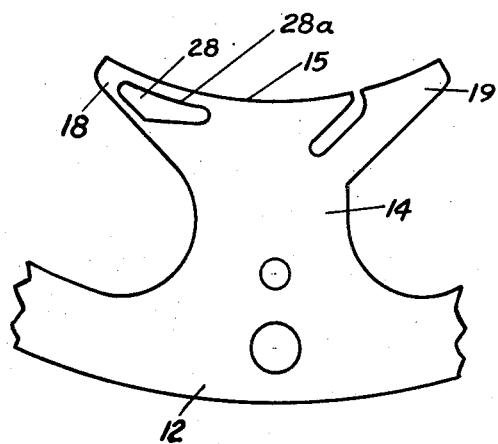
Fig. 5 is a fragmentary illustration of another modified form of pole construction.

In Fig. 5 there is disclosed an illustrative embodiment of a flux shifting slot 28 taking the form of a substantially triangular punched or cut out opening having an arcuate inner edge 28a substantially concentric with the pole face 15. Here again the detailed configuration, size and location of the gap may be variable within limitations to attain varying effects in the characteristics of efficiency and torque.

Motors constructed in accordance with the present invention provide for improved and unexpected control of the relative effects of efficiency and starting torque over the wide ranges desired to adapt shaded pole motors to their many uses.

In addition to providing improved control over flux distribution for attaining varied relative effects, motors constructed in accordance with the present invention enable motors to be operated with efficiencies and starting torques far greater than have been heretofore attainable.

Further, the present invention provides for the provision of shaded pole motors which attain and satisfy all of those objects and advantages heretofore enumerated.

It is to be noted that while certain embodiments of the invention have been shown and described herein, such embodiments are primarily illustrative of the motor constructions which will accomplish the new and useful results constituting the basic concepts of the present invention. The particular details of construction and terms of description herein were chosen for purposes of brevity and clearness of understanding and no unnecessary limitations are to be implied therefrom beyond the requirements of the prior art.

Having now described my invention and the new and useful results obtained thereby, what I desire to claim is:

1. In an electric motor of the shaded pole type, a rotor, a stator concentrically surrounding the rotor, the stator being systemically divided into a plurality of poles, each of said poles comprising a trunk portion and an outer arcuate face concentrically spaced from the rotor, the poles being equally spaced apart about the rotor to provide radially extending air gaps between the edges of adjacent poles, the arcuate faces of the poles being spaced radially from the rotor with said spacing being of uniform width radially of the motor axis, each pole having a leading edge and a trailing edge, the trailing edge of each pole being provided with a shading winding, the leading edge of each pole being provided with an arcuate shaped closed end slot acting as a flux shifting opening, the opening lying wholly within the pole but closely adjacent the arcuate face of the pole, said slot being localized as to length to the leading edge of the pole, and said slot having its longest axis extending perpendicular to the radius of the rotor.

2. In an electric motor of the shaded pole type, a rotor, a stator concentrically surrounding the rotor, the stator being systemically divided into a plurality of poles, each of said poles comprising a trunk portion and an outer arcuate face concentrically spaced from the rotor, the poles being equally spaced apart about the rotor to provide radially extending air gaps between the edges of adjacent poles, the arcuate faces of the poles being spaced radially from the rotor with said spacing being of uniform width radially of the motor axis, each pole having a leading edge and a trailing edge, the trailing edge of each pole being provided with a shading winding, the leading edge of each pole being provided with an arcuate shaped closed end slot acting as a flux shifting opening, the opening lying wholly within the pole but closely adjacent the arcuate face of the pole, said slot being localized as to length to the leading edge of the pole and of the same width throughout its length, and said slot having its longest axis extending perpendicular to the radius of the rotor.

References Cited in the file of this patent

UNITED STATES PATENTS

| | | |
|---|---|---|
| 1,884,140 | Nickle | Oct. 25, 1932 |
| 2,185,990 | Schurch | Jan. 2, 1940 |
| 2,591,117 | Ballentine | Apr. 1, 1952 |

FOREIGN PATENTS

| | | |
|---|---|---|
| 1,064,568 | France | Dec. 23, 1953 |
| 210,269 | Switzerland | Sept. 2, 1940 |